United States Patent [19]

Malekos

[11] Patent Number: 4,881,256
[45] Date of Patent: Nov. 14, 1989

[54] ADJUSTABLE HEAD SUPPORT FOR TELEPHONE HANDSETS

[76] Inventor: George E. Malekos, 897 Elliott Rd., Paradise, Calif. 95969

[21] Appl. No.: 31,159

[22] Filed: Mar. 25, 1987

Related U.S. Application Data

[63] Continuation-in-part of Ser. No. 726,141, Apr. 22, 1985, abandoned.

[51] Int. Cl.$^4$ .......................... H04M 1/05; A47F 5/00
[52] U.S. Cl. .................................... 379/449; 248/181; 248/288.5; 403/90; 403/114; 403/122; 379/430; 379/446
[58] Field of Search ............... 379/449, 446, 433, 430; 403/90, 114, 122; 248/288.3, 288.5, 181

[56] References Cited

U.S. PATENT DOCUMENTS

| | | |
|---|---|---|
| 675,106 | 5/1901 | Oberle ............................ 403/90 |
| 2,020,084 | 11/1935 | Siddeis ........................... 379/449 |
| 2,360,027 | 10/1944 | Werner ........................... 379/430 |
| 2,481,387 | 9/1949 | Bonecutter .................... 379/446 |
| 3,691,788 | 9/1972 | Mazziotti ....................... 403/90 |
| 4,048,453 | 9/1977 | Seidel ............................. 379/430 |
| 4,620,813 | 11/1986 | Lacher ........................... 403/122 |

FOREIGN PATENT DOCUMENTS

| | | | |
|---|---|---|---|
| 110369 | 4/1944 | Sweden ........................... 379/449 |
| 721258 | 1/1955 | United Kingdom ............ 381/187 |
| 731830 | 6/1955 | United Kingdom ............ 379/430 |

Primary Examiner—Jin F. Ng
Assistant Examiner—Danita R. Byrd

[57] ABSTRACT

The invention provides a headband fastened by moveable ball and socket to a mounting ring attachable to the earpiece of a standard telephone handset. The ball affixed to the headband has an adjust tab on the rounded end which fits adjust receptacles in the base of the socket. The tab and receptacle arrangement allows a three-position positive adjustment of the handset position in relation to the headband. In a square-type attachment for modern rectangular telephone handsets, an embodiment designed for the purpose includes two holder frames, one for right ear use and one for left ear use through positioning of the socket holder. The headband and holder for rectangular handsets includes a three-position positive adjust ball and socket fitting and an opened frame yoke that supports the earpiece attachment frame in a manner which prevents interference with the plunger on and off switch of the telephone handset.

6 Claims, 2 Drawing Sheets

U.S. Patent    Nov. 14, 1989    Sheet 1 of 2    4,881,256
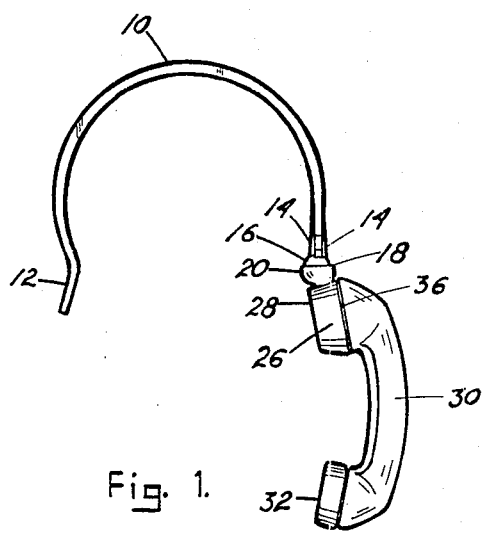
Fig. 1.
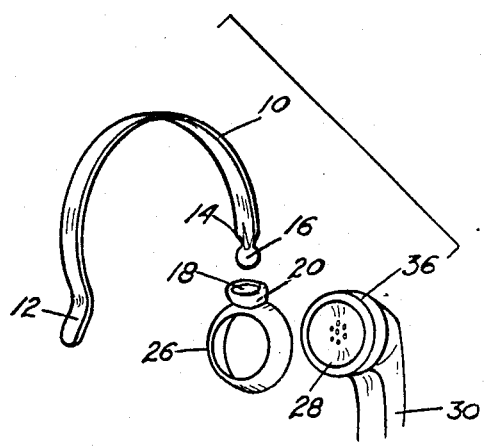
Fig. 2.
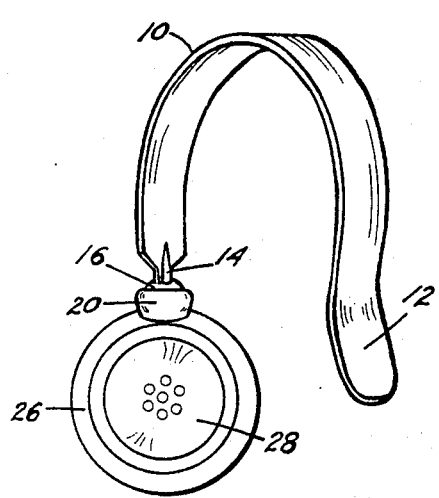
Fig. 3.
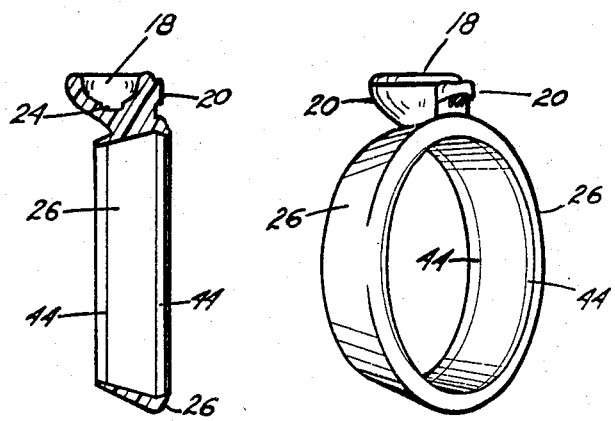
Fig. 4.A    Fig. 4 B
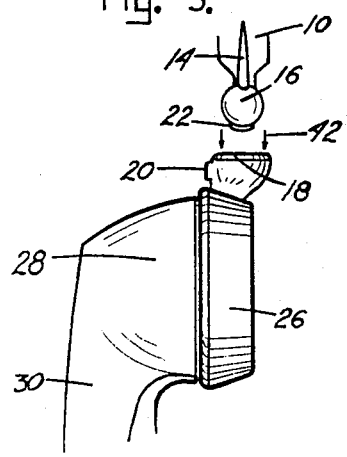
Fig. 5. A
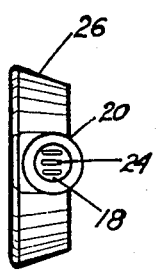
Fig. 5. B
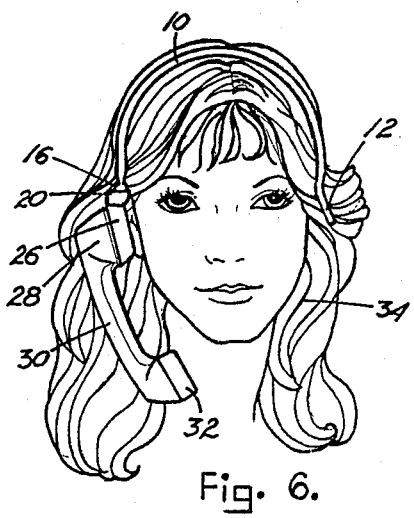
Fig. 6.

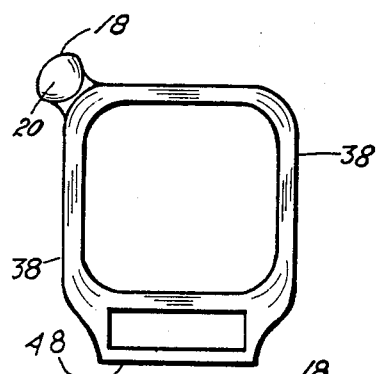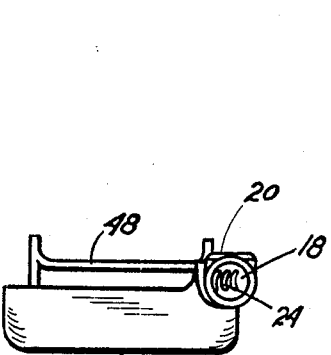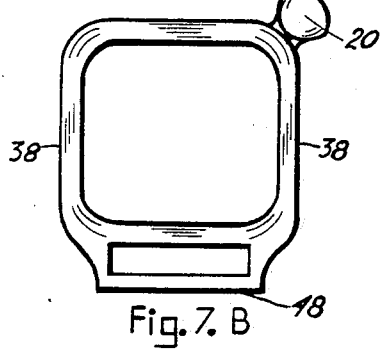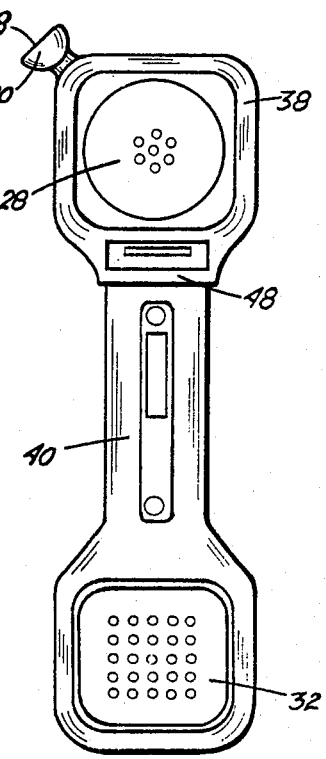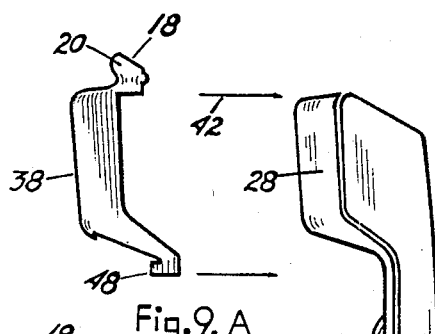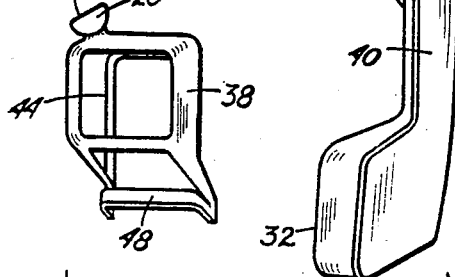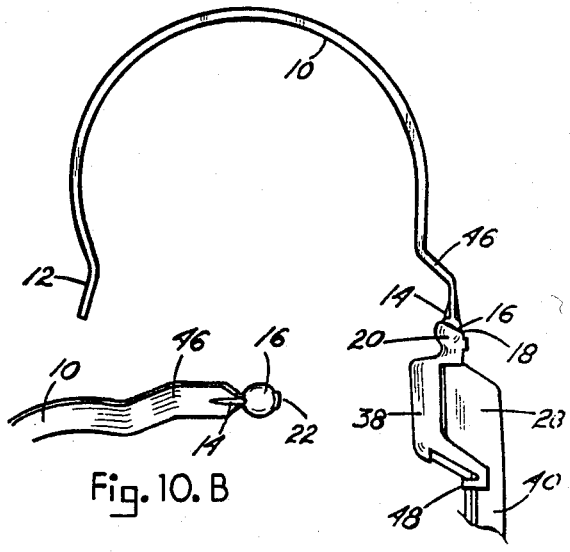

ADJUSTABLE HEAD SUPPORT FOR TELEPHONE HANDSETS

This is a FWC continuation-in-part of Ser. No. 06/726,141, filed 4-22-85, now abandoned.

BACKGROUND OF THE INVENTION

1. Field of the Invention

The present invention relates to devices for holding standard telephone handsets and rectangular telephone handsets positioned on the head for hands-off talking. It is particularly directed towards a device attachable to presently used equipment but it can also be manufactured directly into the handset housing particularly in the modern electronic handsets.

2. Description of the Prior Art

Attempts at designing devices for holding telephone handsets in position with a headband are more often seen in patent documents than in the market place. An acceptable headband suitable for holding the weight of even modern telephone handsets has just not been available until now. The present invention is unique in that it will support handsets positioned as desired by the user and the holding position is adjustable through mechanics built into a ball joint attachment. The patents which seem most representative of the developing art include the following:

1. M. A. Sidders U.S. Pat. No. 2,020,084, issued Nov. 5, 1935, shows a double band headband using a reversed ball fitting into a socket with a threaded plug for screwdown tightening. To hold the telephone handset in a given position, a plug must be screwed down to tighten the ball in the socket structure. A clamping jaw fitting the handset body is used to hold the headband ring stable. This type of ring and holder clamp would not work on a modern-day handset because of the body shapes presently in use. The present invention conforms to modern design and utilizes the shape and divisional structure of today's handset by providing edge protrusions aligned in the support ring structure to fit the assembly joints of the modern handset. The present invention also provides internal adjustment fitting in a socket and on a snap-in ball allowing the attached headband to be easily repositioned without any unscrewing or screwing down of holding parts.

2. The Roberton invention, British patent number 731,830, issued June 15, 1955, shows a single headband terminating in a ball. The ball socket must be manufactured into the handset earpiece cover and only resilience in the material prevents free-movement of the ball which is tight-fitted into the socket. With much use, only a short period of time would be required to wear the surface sufficiently to loosen the hold and render the retention inefficient. The present invention does not rely solely on resilience in the material for ball retention. A tab on the ball fits adjustment apertures in the base of the socket for positioning the headband. The mechanics would still be effective even with a loss of retention in the materials over a period of time.

3. A patent issued to Bonecutter, dated Sept. 6, 1949, shows a ring support for a telephone handset which attaches to a single headband by a clamp fitting. A snap band with a single support seat and a split band are the two types of fixtures shown for attachment to the telephone handset. Both attach methods require a handset earpiece structure which can be unscrewed and retightened for any effective installation of this type of band. No modifications of these rings would make them fittable to a modern square-type telephone handset earpiece. My attachment rings for round type telephone handset earpieces and for modern square types are provided with dual rims. An inside rim fits at the screwdown break on a standard round-type earpiece cap and an outside rim fits the outer surface of the cap forming a securely fitted, snap-on headband holding ring. On a square-type handset structure, my inside rim fits the snap line of the handset case structure and the outside rim seats down on the handpiece earphone cover again forming a securely held fitting. On square-type earpieces my attachment ring is also supported by a yoke fitted below the ring to the handpiece handle portion.

4. Additional interesting prior-art patents examined but not necessarily considered pertinent to the present invention include: U.S. Pat. No. 4,121,061, issued to Donaldson on Oct. 17, 1978, which illustrates a completely restructued telephone with a headband holder. A U.S. Pat. No. 3,225,147, issued to Dollinger on Dec. 21, 1965, shows an auxiliary application of the headband principal. Other patents seen include U.S. Pat. Nos. 2,721,234, to Gillie, Oct. 18, 1955; to Hutchinson, 2,538,458, Jan. 16, 1951; to Lewis, 2,854,523, Sept. 30, 1958; to Pollard, 2,843,680, July 15, 1958; to McCorkell, 2,598,928, June 3, 1952; and to Seldel, 4,048,453.

A similar effective ball joint swivel with internal adjustment features as described in the specification of the present invention was not seen in prior-art patents examined. Headbands both single and double are noted as being in common use for a variety of applications and as structured for the present invention should not be detrimental to patent allowance. The double-rimmed ring for attachment to both round and squared modern telephone handsets is unique to the present invention.

BRIEF DESCRIPTION OF THE DRAWINGS

In the drawings,

FIG. 1 is a side view of a standard telephone handset with the head support attached and ready for use.

FIG. 2 shows the headband in position for snapping the ball into the socket of the support ring with the ring positioned for snap attachment to the earpiece of a standard telephone handset.

FIG. 3 is a frontal view of the earpiece of a standard telephone handset with the snap-on receiver support ring mounted and the headband attached.

FIG. 4 at A shows a sectional drawing of the receiver mounting ring and illustrates the snap rims on the ring, the ball socket and support, and positions of the adjustment apertures in the base of the ball socket; and B shows a perspective of the receiver mounting ring.

FIG. 5 at A shows the mounting ring with the headband ball ready for snap-in mounting in a side view, and at B the mounting ring is shown turned so the three-position adjustment apertures in the base of the socket are visible.

FIG. 6 shows the headband attached to a standard telephone headset in use.

FIG. 7 at A shows a front view of a receiver ring designed for use with modern rectangular telephone handsets with the socket housing arranged for right ear use, at B the square-type mounting ring is shown with the socket housing positioned for left ear use; and at C the square-type mount is positioned in a top view to show the adjustment apertures in the base of the socket.

FIG. 8 is a frontal view of a modern rectangular telephone handset with the square-type mount installed on the handset earpiece and showing the positioning of the support yoke.

FIG. 9 at A is a side view of the square-type mount positioned for snap-fitting to the earpiece of a modern rectangular telephone handset and B is a perspective drawing of the square-type mount.

FIG. 10 at A shows the square-type mount fitted to a rectangular telephone handset earpiece with the headband attached and ready for use, and at B the angled end of the headband at the ball attachment is shown.

DRAWING REFERENCE NUMERALS 10 headband
12 release tab
14 ball support flange
16 ball
18 socket
20 socket housing
22 ball adjust tab
24 three-position socket adjust receptacles
26 receiver mounting ring
28 telephone handset earpiece
30 handset body
32 handset mouthpiece
34 illustrative user
36 earphone housing ring
38 square type receiver snap-on fitting
40 rectangular-type telephone handset
42 attachment directional arrows
44 snap retainer edges
46 angled headband positioning end
48 mounting ring support yoke

DESCRIPTION OF THE PREFERRED EMBODIMENTS

Referring now to the drawings and to FIG. 1 where the headband 10 with release tab 12 at one end is shown attached to a standard telephone handset by a ball 16 at the other end affixed in socket 18 held in receiver mounting ring 26. Receiver mounting ring 26 is illustrated snapped over the earphone housing ring 36 of the telephone handset earpiece 28. Ball 16 at the end of headband 10 is reinforced by ball support flanges 14 and is inserted into socket 18 in socket housing 20. FIG. 2 illustrates headband 10 separated from receiver mounting ring 26 with ball 16 positioned for insertion into socket 18 and receiver mounting ring 26 positioned to be snapped over earphone housing ring 36. Ball adjust tab 22 is affixed at the bottom of ball 16 as illustrated in FIG. 2. For reference purposes in FIG. 1, FIG. 2, and FIG. 6, a standard telephone handset is illustrated with telephone handset earpiece 28, telephone body 30, handset mouthpiece 32, and earphone housing ring 36 as functional parts.

In FIG. 3, a frontal view of telephone handset earpiece 28 is shown with receiver mounting ring 26 affixed. Ball 16 supported by flange 14 is snapped into socket 18 supported by socket housing 20. Headband 10 is affixed to ball 16 at the flanged 14 support end and is angled outward at the other end to form release tab 12 as illustrated in FIG. 3. In a sectional view of receiver mounting ring 26 shown at A in FIG. 4, as illustrated, socket 18 is shown at the top in socket housing 20 with one cut of three-position socket adjust receptacles 24 shown in the bottom of socket housing 20. Receiver mounting ring 26 is opened to show the raised snap retainer edges 44 which fit over the front and rear edges of earphone housing ring 36. In B at FIG. 4, a perspective view of receiver mounting ring 26 is shown. The relative positions of snap retainer edges 44 are illustrated along the inside rim of receiver mounting ring 36. Socket housing 20 is shown at the top of receiver mounting ring 26 and the position of socket 18 is indicated.

FIG. 5 is a side view of receiver mounting ring 26, snapped onto telephone handset earpiece 28. As illustrated, handset body 30 is positioned downwardly, and socket housing 20 with socket 18 indicated is shown at the top of receiver mounting ring 26. Ball 16 is positioned for insertion into socket 18 and the ball adjust tab 22 can be readily seen affixed at the bottom of ball 16. Ball support flange 14 and the attach end of headband 10 can be seen. Attachment directional arrows 42 show movement of ball 16 for attachment purposes. In FIG. 5 at B, receiver mounting ring 26 has been turned sideways to show inside socket 18 so the three-position adjustment receptacles 24 in the base of socket 18 can be seen. When ball 16 is snapped into socket 18, ball adjust tab 22 fits into one of the three-position socket adjust receptacles 24 which holds the headband 10 in a firm desired position. Ball adjust tab 22 can be moved into any of the three positions by pressing on headband 10 adjacent ball support flanges 14 to move ball 16 within socket 18. For repositioning, ball 16 does not have to be removed from socket 18. Movement of ball 16 repositions headband 10 in relationship to the telephone handset. FIG. 6 further illustrates the versatility of this invention as user 34 can adjust the position of headband 10 for her convenience and comfort.

At FIG. 7 on page 2 of the drawings, A is a frontal view of square-type receiver snap-on fitting 38 for attachment to a modern rectangular type telephone handset 40 with socket housing 20 angled for using the telephone handset earpiece 28 against the right ear. Special mounting ring support yoke 48 is shown at the bottom of square type receiver snap-on fitting 38. At B in FIG. 7, square type receiver snap-on fitting 38 is illustrated with socket housing 20 angled for using the left ear. At C in FIG. 7, square type receiver snap-on fitting 38 is illustrated in a top view and the inside of socket 18 in socket housing 20 is visible so the three-position socket adjust receptacles 24 in the base of socket 18 can be plainly seen. The position of mounting ring support yoke 48 is again illustrated at both B and C in FIG. 7.

FIG. 8 shows a modern rectangular type telephone handset 40 with handset mouthpiece 32 downwardly, as illustrated, and telephone handset earpiece 28 at the top. Square type receiver snap-on fitting 38 is attached over the housing of telephone handset earpiece 28 and socket housing 20 with socket 18 indicated is angled for use with telephone handset earpiece 28 at the right ear. Mounting ring support yoke 48 is shown fitted across the handle of rectangular type telephone handset 40. The various parts described are best seen in the illustrations at FIG. 9. A in FIG. 9 is a side view of square type receiver snap-on fitting 38 positioned for installation on telephone handset earpiece 28 with attachment directional arrows 42 indicating attachment direction. The snap retainer edges 44 are best seen in B of FIG. 9. These retainer edges 44 are shaped to fit and snap into the casement attach edges of rectangular-type telephone handset 40. FIG. 10 at A illustrates square type receiver snap-on fitting 38 mounted to rectangular-type telephone handset 40. Snap retainer edges 44 fit in and follow the casing assemblage line of the handset and mounting ring support yoke 48 supports square type receiver snap-on fitting 38 lower on the handset body. The opening above mounting ring support yoke 44 allows modern rectangular-type telephone handset 40 to be cradled or wall-hung without interference with the telephone on/off switch by parts comprising the present invention.

Although I have described my invention with considerable details in the foregoing specification, it is to be understood that in practice, I may make modifications in the design or structure of the invention which do not exceed the scope intended by the appended claims hereto.

What I claim is:

1. An adjustable head support for telephone handsets comprising:
   a snap-on mounting ring sized to fit snugly over the earpiece housing ring of a standard telephone handset;
   said mounting ring rimmed at two opposite ends with inwardly faced retainer edges;
   a socket support member affixed to the outward surface of said mounting ring;
   a concave receptacle in said socket support member sized for snap-in connection of
   a ball member affixed a one end of
   a single-strap headband;
   said ball member reinforced at the headband connection by
   flanged extensions attached to the ball and extending along both flat sides of said headband;
   said headband sized for the human head and having adjustability for variations in head size through pliability in the band material;
   said headband of semicircular configuration with the ball-attach end angled outwardly and the tip of the opposite end angled outwardly to form a release flap;
   said ball and said concave receptacle in cooperative snap-in attachment and snap-out detachment constituting an operational ball and socket connection;
   said ball having on the rounded end thereof a short tab extension and
   said socket having three rectangular grooves in the base thereof;
   said tab on said ball inserted into one of said socket grooves when said ball and socket are engaged providing firm positioning to said headband and said telephone handset;
   said ball tab moveable from groove to groove by force applied to said headband adjacent said reinforcing flange extensions said headband and ball connection;
   said ball and socket with said ball tab and said socket grooves cooperatively providing adjustability to said headband.

2. The adjustable head support for telephone handsets of claim 1 with said adjustable head support, all parts thereof, being manufactured of durable plastic.

3. An adjustable head support for telephone handsets comprising:
   a snap-on mounting ring sized to fit snugly over the earpiece housing ring of rectangularly styled telephone handsets;
   said mounting ring of substantially square configuration and rimmed along opposite ends with inwardly faced retainer edges;
   a socket support member positioned upwardly cornerwise on the outer surface of said mounting ring as a part thereof;
   a concave receptacle in said socket support member sized for snap-in connection of
   a ball member affixed at one end of
   a single-strap headband;
   said ball member reinforced at the headband connection by
   flanged extensions attached to the ball and extending along both flat sides of said headband;
   said headband sized for the human head and having adjustability for variations in head size through pliability in the band material;
   said headband of semicircular configuration with the end affixed to said ball member being straightened vertically then angled inwardly into a head-sized curvature and oppositely the terminal end thereof angled somewhat outwardly forming a release tab;
   said ball and said concave receptacle in cooperative snap-in attachment and snap-out detachment constituting an operational ball and socket connection;
   said ball having on the rounded end thereof a short tab protrusion and
   said socket having three rectangular grooves in the base thereof;
   said tab on said ball inserted into one of said socket grooves when said ball and said socket are engaged providing firm positioning to said headband and said telephone handset;
   said ball tab movable from groove to groove by force applied on said headband adjacent said reinforcing flange extensions at said headband and said ball connection;
   said ball and said socket with said ball tab and said socket grooves cooperatively providing adjustability to said headband.

4. The adjustable head support for telephone handsets of claim 3 wherein an opened front support yoke is formed downwardly in part with said squared mouting ring configured for attachment adjacent said earpiece on said rectangular telephone handset to the body section thereof with said opened front aligned for non-interference with the handset plunger switch.

5. The adjustable head support for telephone handsets of claim 3 wherein said socket support member positioned upwardly cornerwise on the outer surface of said mounting ring as a part thereof is manufactured to alternate upwardly corners of said mounting ring dependent upon right or left hand applications.

6. The adjustable head support for telephone handsets of claim 3 with said adjustable head support, all parts thereof, being manufactured of durable plastic.

* * * * *